(No Model.) 2 Sheets—Sheet 1.

G. RICHARDSON.
SHEEP SHEARING MACHINE.

No. 384,545. Patented June 12, 1888.

WITNESSES.
F. L. Ourand
J. F. Reily

INVENTOR.
George Richardson,
by Louis Bagger & Co.
Attorneys.

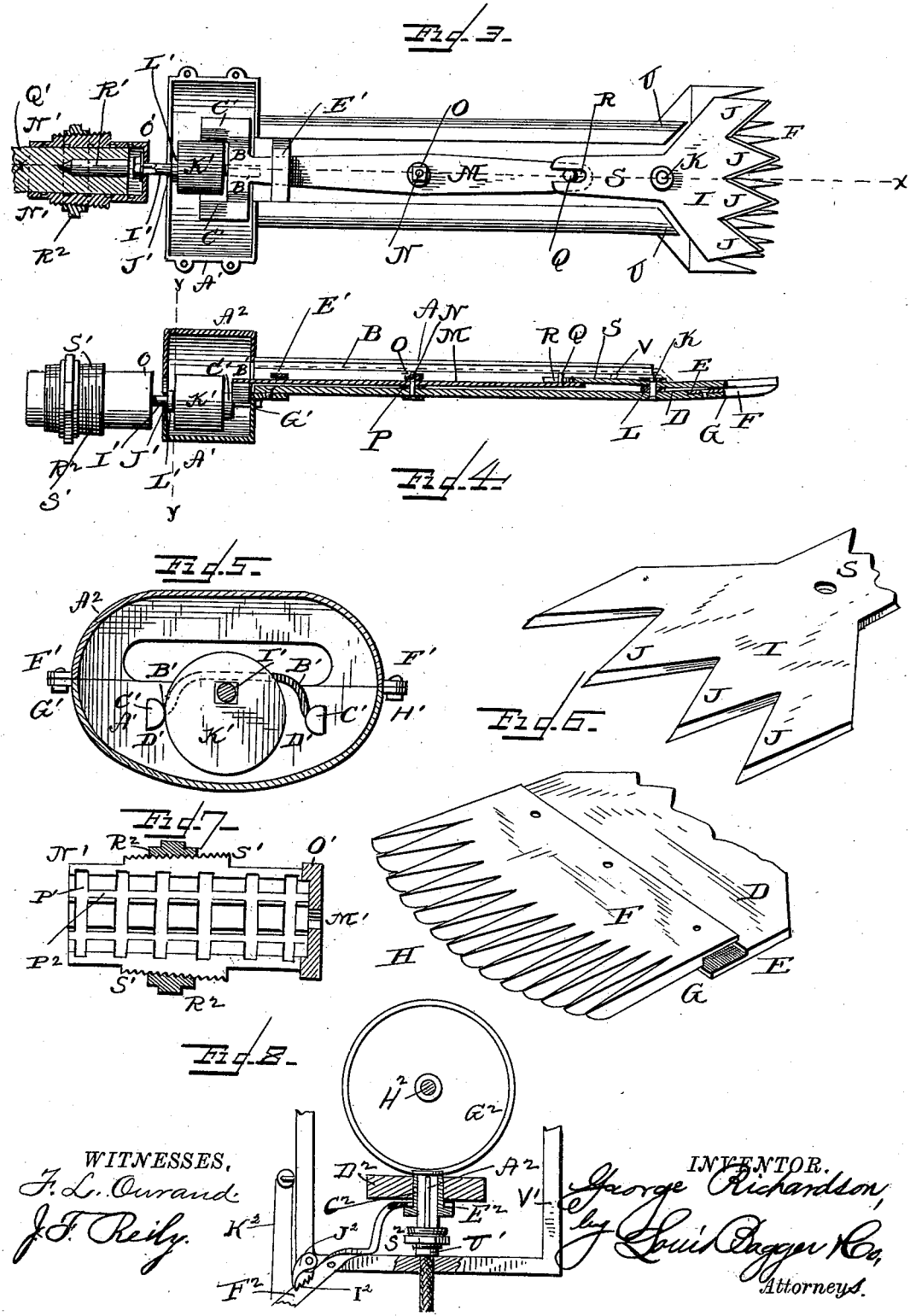

UNITED STATES PATENT OFFICE.

GEORGE RICHARDSON, OF MENARDVILLE, TEXAS.

SHEEP-SHEARING MACHINE.

SPECIFICATION forming part of Letters Patent No. 384,545, dated June 12, 1888.

Application filed November 22, 1887. Serial No. 255,915. (No model.)

*To all whom it may concern:*

Be it known that I, GEORGE RICHARDSON, a citizen of the United States, and a resident of Menardville, in the county of Menard and State of Texas, have invented certain new and useful Improvements in Sheep-Shearing Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
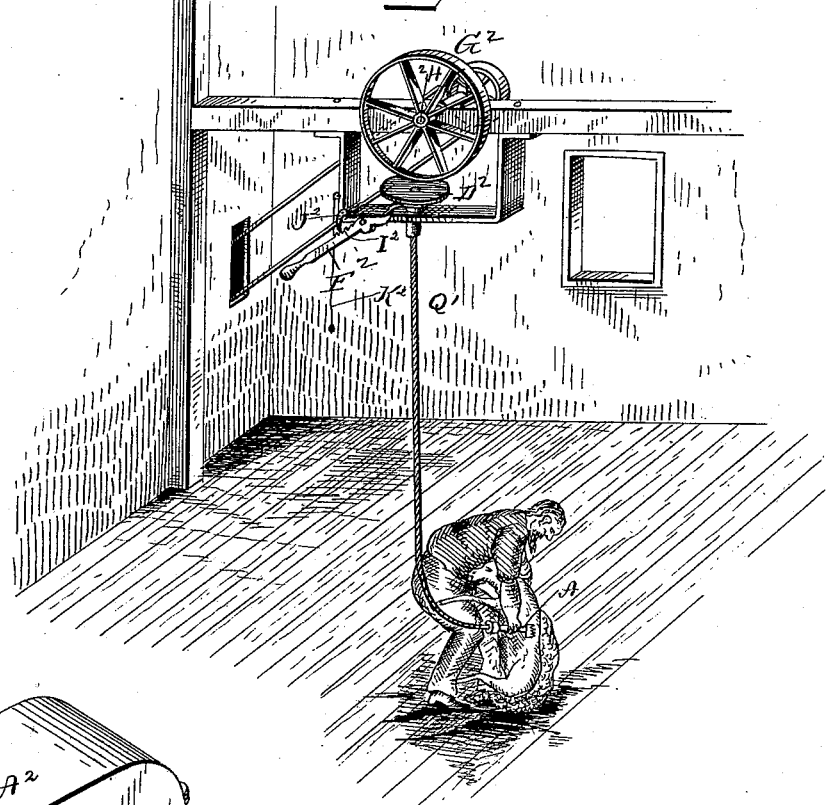
Figure 2:
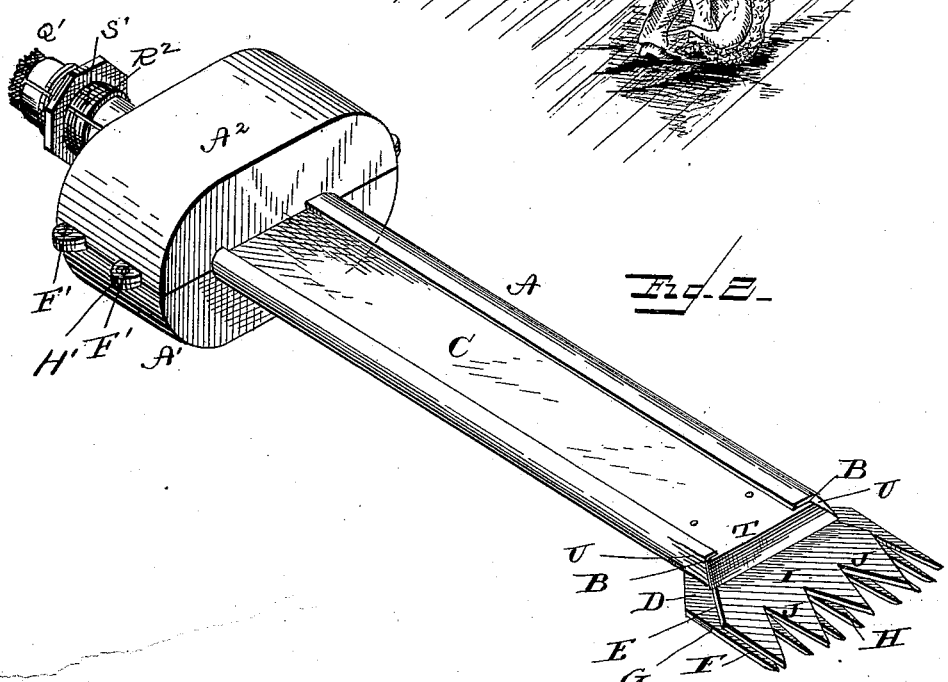

Figure 1 is a perspective view showing my new and improved shearer in operation. Fig. 2 is a perspective view of the shearer alone. Fig. 3 is a top plan view of the shearer with the top or upper parts of the handle and casing removed. Fig. 4 is a longitudinal sectional view taken on the plane indicated by line $x$ $x$ on Fig. 3. Fig. 5 is a transverse sectional view through the end casing, taken on the plane indicated by line $y$ $y$ of Fig. 4. Fig. 6 is a detail view of the stationary and movable blades or cutter-plates. Fig. 7 shows in detail the rope-socket; and Fig. 8 is a sectional detail view, hereinafter referred to.

The same letters of reference indicate corresponding parts in all the figures.

My invention consists in a new and improved shearing tool or machine, which is especially designed for shearing sheep rapidly and effectively, and without injuring either the sheep or the wool, but which can also be used effectively in clipping horses; and my invention will be hereinafter fully described and claimed.

By the use of the shears now employed thousands of sheep are yearly cut and injured, and a great number yearly die from the injuries received while being sheared, while the wool is so cut that its value is depreciated several cents a pound, entailing an enormous loss yearly.

The object of my invention is to prevent these great losses to the sheep-owners of the country by producing a shearing-machine which will shear the sheep rapidly and evenly, and at the same time avoid cutting the sheep, thus preventing the injury to and loss of thousands of sheep yearly, and also increasing the market value of the wool; and to these ends my invention consists in the construction, arrangement, and combination of parts which will be hereinafter fully described and claimed.

Referring to the several parts by letter, A indicates the lower or main part of the hand-grasp or handle of my machine, which may be made of one-eighth-inch plate-iron, or of whatever material is most advisable. The longitudinal sides of this handle are curved up and around, as shown, and have formed in their inner edges the longitudinal grooves B B, in which grooves slide the longitudinal edges of the top plate, C, of the handle, which plate closes and forms the top of the handle. The forward end of the handle A is extended and widened, as shown, to form a support for the lower stationary cutting-plate, the forward straight edge of this end support, D, being recessed longitudinally upon its upper side to form a shoulder, E, the end plate, D, being decreased in thickness about one-half by this longitudinal recess.

F indicates the lower stationary cutting blade or plate, which is formed at its rear straight end with a longitudinal recess on its lower side, forming a shoulder, G, and the stationary cutting blade or plate is secured to the end plate, D, of the handle by riveting its recessed rear end upon the recessed forward end of the end plate, D. This lower stationary cutting-plate is made of three-sixteenth-inch cast-steel, and is formed with, preferably, fourteen teeth, H, which are beveled on their lower edges and rounded on the lower side of their points. Instead of these teeth coming to a point, they may be made an eighth of an inch wide at their points, if desired.

I indicates the upper movable cutting-plate, which is made of one-eighth-inch cast-steel, with the four teeth J, which are beveled on their upper edges. The movable blade is pivoted upon the stationary blade by a pivot-bolt, K, the head of which is countersunk in the handle A, as shown in Fig. 4, while a washer, L, is placed upon this pivot-bolt under the movable blade to raise the teeth of the upper blade on a level with those of the lower blade. The teeth of the stationary blade increase in thickness from their base to their points, and the teeth of the movable blade increase in thickness from their base to their points in the same manner, the object of this construction being to bring the teeth of the two plates in close contact with each other and prevent the loss of the pressure when the nut on the upper end of the pivot-bolt K is tightened or screwed down.

Within the handle A is centrally pivoted the connecting-lever M, which is pivoted by a pivot-bolt, N, the head of which is countersunk in the handle A, a nut, O, being screwed upon the upper end of this nut above the lever, and a washer, P, is placed upon the pivot-bolt N below the lever, to prevent friction while the lever is in motion. The forward end of this centrally-pivoted lever is provided with an upwardly-projecting pin, Q, which fits and works in a longitudinal slot, R, which is formed in the rear end of the stem S of the movable blade, this slotted end of the stem extending over the forward end of the lever, as shown.

The top of the handle A is closed, as before described, by the top plate, C, the forward end, T, of this top plate being bent down so as to come over the top of the rear part of the movable cutting-plate, and thereby, while not interfering with the play of the said blade, preventing the entrance of dirt or wool into the front end of the handle. The corners of the forward end of the handle A are protected by the downwardly-bent cap-pieces U U, which, while giving full play to the movable blade, operate to prevent the entrance of dirt or wool into the handle. The forward end of the top plate, C, is braced in place by the curved lugs V V, the ends of which project under the sides of the part A.

At the rear end of the handle A is formed the lower half of the cylindrical box or casing A'. Within the forward end of this casing projects the rear end of the lever M. This rear end of the lever is formed with the two arms B' B', which extend at right angles to the handle, and are bent down for one-sixteenth of an inch next to the end of the lever, and then extend in a plane parallel to the lever. The object of this bend in the arms is to place their outer ends nearer the center of gravity. The outer ends of these arms B' extend backward, and are made of the thickness shown in Fig. 5, while the inner sides, D', of these ends C' are rounded or curved, as shown in the said view, to reduce friction and prevent the parts from hanging or sticking.

Upon the rear end of the handle A is secured a transverse guard, E', which extends over the rear end of the lever, and holds the lever down while the eccentric wheel is on the upstroke. This guard allows the lever sufficient space to work in to give the movable blade sufficient length of stroke, so that the outside teeth of the upper blade will cut perfectly on the outside teeth of the stationary blade.

A² indicates the upper half of the cylindrical casing, which can be secured to the lower half, A', by the screws F' F', the bearings G' and H' being formed at the meeting edges of the top and bottom of the casing, so that the shaft I', with its eccentric wheel, can be readily placed in position within the casing. The forward end of this shaft is rounded, to adapt it to fit and turn in the bearing G' in the front of the casing, and it is formed near its rear end with a rounded portion, J', which fits and turns in the bearing in the rear end of the casing. The middle portion of this short shaft is squared, and upon this squared central portion is mounted eccentrically the eccentric drive-wheel K'; or the shaft may be rounded at its center and the eccentric wheel keyed thereon. A collar, L', is secured by a set-screw upon the rear end portion of this shaft within the casing and next to the rear end of the same, and serves to hold the shaft and wheel in position. This eccentric wheel is of such diameter as to turn or revolve snugly between the rounded faces of the rearwardly-projecting ends of the arms at the rear end of the lever; and it will be seen that when the short shaft I' is rapidly revolved, as will be hereinafter described, as the eccentric wheel is revolved between the rounded surfaces of the arms at the rear end of the lever, the said end of the lever will be rapidly but evenly reciprocated back and forth, swinging once in each direction for each revolution of the eccentric wheel, so that the shearer has two distinct cuts for each revolution of the shaft and wheel. The projecting rear end of the short shaft I' is squared outside of the casing, and upon this squared end is secured a rope-socket, the lower end of the socket having a central square hole, M', through which the squared end of the short shaft fits, and a nut is screwed upon the threaded end of the shaft within the socket, thus securing the socket firmly to the said shaft. This rope-socket is formed with the two side pieces or sections N' N', which are connected at their lower ends by the end piece, O', through which the end of the shaft extends. These sides N' are formed on their inner concave sides with the longitudinal and transverse ridges P' P², which serve to grip and hold the end of the rope firmly. In the lower end of the flexible rope driving-shaft Q' is inserted a round wooden or iron core or wedge, R', (shown in Fig. 4,) and this lower end of the rope is then inserted in the rope-socket, and the socket is tightened upon the end of the rope by means of a thin nut, R², which is screwed down upon threads S', which are formed upon the exterior of the socket, and which increase in thickness or diameter toward the lower end of the socket, so that as the nut is screwed down along this conical threaded part of the socket the rope will be clamped more and more firmly within the socket, so as to render it impossible for the lower end of the flexible rope to be easily pulled out of the socket.

The flexible shaft Q' is formed of one-inch woven cotton rope, and its upper end is suspended from a height of usually seven feet above the operator, as shown in Fig. 1 of the drawings. The upper end of the flexible rope-shaft has a rope-socket, U', similar in construction to the rope-socket previously described, secured upon its upper end, except that this upper socket is longer. The upper end of the rope is secured in a bracket, V', the nut S² forming a bearing by resting upon the upper side of the lower part of the supporting-bracket V', and thus holding the upper end of the rope up in the said bracket.

Upon the upper part of this upper end socket is formed longitudinally a rib or feather, A², and this feather fits in a groove which is formed in the bore of a sleeve, C², upon the upper part of which is secured a rubber wheel, D², four inches in diameter. This rubber wheel is secured rigidly upon the upper part of the sleeve C², and the lower end of this sleeve has an annular groove, E², formed around it, and in this annular groove fits the bifurcated inner end of a shifting-lever, F², which is centrally pivoted, as shown, in the bracket V', and by means of which the rubber wheel D² is thrown into or out of gear. The rubber wheel, when raised by the lever raising the sleeve C², comes in contact at its edge, on its upper side, with the rim or periphery of the main drive-wheel G². This drive-wheel is sixteen inches in diameter, and is mounted on a drive-shaft, H², which is driven by any suitable power, such as steam, water, or horse power. It will be seen that by raising the sleeve C² by the shifting-lever F², and with it the rubber wheel, the edge of the said wheel will be brought into contact with the lower edge of the drive-wheel, which is driven at a speed of one hundred revolutions per minute, and that the shearer will be given eight hundred single cuts per minute. By drawing down the sleeve C² by the shifting-lever the shearer will be brought to a stop, and can be started at any moment by raising the sleeve, and with it the rubber wheel.

From the foregoing description, taken in connection with the accompanying drawings, the construction, operation, and advantages of my invention will be readily understood.

It will be seen that my new and improved shearer is comparatively simple and very strong in construction, and exceedingly effective in its operation. It will shear the sheep rapidly, cutting the wool evenly, and thereby increasing its value in the market, and will not injure the sheep in the least, thereby effecting an immense saving, both in the wool and in the sheep themselves, as thousands are yearly mutilated and killed by the shears now in use. Each main driving-wheel G² will drive six shearing-machines—three on each side—and as the power required to operate each machine will be so light a very small horse-power will run quite a number of shearers.

Having thus described my invention, what I claim, and desire to secure by Letters Patent of the United States, is—

1. The combination, with the handle having the casing at its rear end, of the stationary blade having the series of teeth beveled on their lower edges, the pivoted movable blade having the teeth beveled on their upper edges and having the longitudinal slot in its rear end, the centrally-pivoted lever having the pin at its forward end and having at its rear end the projecting arms, the thick rearward portions of which are rounded on their inner sides, the shaft mounted in the end casing, the eccentric disk mounted upon the said shaft, and suitable means for revolving the said shaft.

2. The combination, with the handle having the casing at its rear end and formed with the recessed forward end, of the stationary steel blade having the recessed rear end and the series of teeth beveled on their lower edges and rounded on the lower sides of their points, the said teeth increasing in thickness from their base to their points, the pivoted movable steel blade having the teeth beveled on their upper edges and increasing in thickness from their base to their points and formed with the longitudinal slot in its rear end, the centrally-pivoted lever having the pin at its forward end and having at its rear end the projecting arms, the thick rearward portions of which are rounded on their inner sides, the shaft mounted in the end casing, the eccentric disk mounted on the said shaft, and suitable means for revolving the said shaft.

3. The combination, with the shears, substantially as described, the centrally-pivoted lever for operating the lower shear-blade, having at its rear end projecting arms, the thick rearward portions of which are rounded on their inner sides, and the shaft provided with the eccentric disk which engages the said arms, of the flexible shaft secured at its lower end to the rear end of the disk-shaft and mounted at its upper end in a supporting-bracket, the rubber wheel adjustably secured upon the upper end of said flexible shaft, and the large drive-wheel.

4. The combination of the shears, the centrally-pivoted lever operating the upper shear-blade and formed with arms at its rear end, and the shaft having the eccentric disk secured thereon and engaging the said arms of the centrally-pivoted lever, with the flexible shaft, the rope-sockets formed with the ridges on their inner sides and the inclined threaded outer surfaces and the clamping-nuts, the supporting-bracket, the rubber wheel having the grooved sleeve fitting on the upper rope-socket, which is formed with a longitudinal key, the shifting-lever, and the main drive-wheel.

5. The combination, with the handle formed with the cap-pieces at the corners of its forward end, and the recessed forward end, and the casing formed in two halves, as described, of the removable top plate for the cover having the downwardly-bent forward end, the stationary steel blade having the recessed rear end and the series of teeth beveled on their lower edges and increasing in thickness from their base to their points, the pivoted movable steel blade having the teeth beveled on their upper edges and increasing in thickness from their base to their points and
5 formed with the longitudinal slot in its rear end, the centrally-pivoted lever having the pin at its forward end, and suitable means for reciprocating it, substantially as set forth.

In testimony that I claim the foregoing as my own I have hereunto affixed my signature in 10 presence of two witnesses.

GEORGE RICHARDSON.

Witnesses:
W. S. STRADER,
C. H. LEWIS.